(12) United States Patent
Alali et al.

(10) Patent No.: US 12,173,593 B2
(45) Date of Patent: Dec. 24, 2024

(54) DOWNHOLE APPARATUS AND SYSTEM FOR ELECTRIC-BASED FRACTURING

(71) Applicant: Eden GeoPower, Inc., Somerville, MA (US)

(72) Inventors: Ammar Alali, Cambridge, MA (US); Mehrdad Mehrvand, Somerville, MA (US)

(73) Assignee: Eden GeoPower, Inc., Somerville, MA (US)

( * ) Notice: Subject to any disclaimer, the term of this patent is extended or adjusted under 35 U.S.C. 154(b) by 0 days.

(21) Appl. No.: 18/136,169

(22) Filed: Apr. 18, 2023

(65) Prior Publication Data

US 2023/0250714 A1    Aug. 10, 2023

Related U.S. Application Data

(63) Continuation of application No. 17/376,809, filed on Jul. 15, 2021, now Pat. No. 11,649,710.

(51) Int. Cl.
| | |
|---|---|
| *E21B 43/24* | (2006.01) |
| *E21B 17/02* | (2006.01) |
| *E21B 36/04* | (2006.01) |
| *E21B 43/26* | (2006.01) |

(52) U.S. Cl.
CPC ............ *E21B 43/26* (2013.01); *E21B 17/028* (2013.01); *E21B 43/2401* (2013.01)

(58) Field of Classification Search
CPC ...... E21B 43/2401; E21B 36/04; E21B 43/24; E21B 36/00
USPC ........................................................ 392/301
See application file for complete search history.

(56) References Cited

U.S. PATENT DOCUMENTS

| | | | | |
|---|---|---|---|---|
| 2,794,504 | A | * | 6/1957 | Carpenter ............... E21B 36/04 |
| | | | | 338/270 |
| 3,220,479 | A | | 11/1965 | Ortloff et al. |
| 3,522,846 | A | * | 8/1970 | New ................... E21B 43/2401 |
| | | | | 392/301 |
| 3,605,888 | A | * | 9/1971 | Crowson ................. E21B 43/20 |
| | | | | 166/248 |
| 3,642,066 | A | | 2/1972 | Gill |
| 3,782,465 | A | | 1/1974 | Bell et al. |

(Continued)

FOREIGN PATENT DOCUMENTS

WO    WO 2013/178826 A1    12/2013

OTHER PUBLICATIONS

International Search Report and Written Opinion for International Application No. PCT/US2022/028929, mailed Aug. 16, 2022.

*Primary Examiner* — Kenneth L Thompson
(74) *Attorney, Agent, or Firm* — Wolf, Greenfield & Sacks, P.C.

(57) ABSTRACT

Downhole tools, systems, and methods for electric-based fracturing are disclosed. A downhole tool for electric-based fracturing may include an outer enclosure, an insulator chamber disposed at least partially within the enclosure, and an electrode disposed at least partially within the insulator chamber. The electrode may extend out from the insulator chamber and the enclosure, and may be configured to transfer electric energy to an exterior environment surrounding the downhole tool. The insulator chamber may be configured to thermally and electrically insulate at least a portion of the electrode from the exterior environment.

24 Claims, 4 Drawing Sheets

(56) References Cited

U.S. PATENT DOCUMENTS

| | | | |
|---|---|---|---|
| 4,576,231 A | 3/1986 | Dowling et al. | |
| 5,060,287 A | 10/1991 | Van Egmond | |
| 5,784,530 A * | 7/1998 | Bridges | E21B 43/2401 |
| | | | 166/60 |
| 7,069,993 B2 | 7/2006 | Hill | |
| 9,243,487 B2 | 1/2016 | Geilikman et al. | |
| 9,556,709 B2 * | 1/2017 | Parman | E21B 36/04 |
| 9,765,606 B2 * | 9/2017 | Snow | E21B 36/04 |
| 9,822,592 B2 | 11/2017 | Bujold et al. | |
| 9,890,627 B2 | 2/2018 | Kasevich et al. | |
| 9,988,888 B2 | 6/2018 | Rey-Bethbeder et al. | |
| 10,041,674 B2 * | 8/2018 | Takeuchi | F23Q 7/001 |
| 11,053,775 B2 * | 7/2021 | Kovalev | E21B 36/04 |
| 11,091,991 B1 | 8/2021 | Mehrvand et al. | |
| 11,215,310 B2 * | 1/2022 | Gavrilin | F16L 53/38 |
| 11,649,710 B2 * | 5/2023 | Alali | E21B 43/2405 |
| | | | 166/248 |
| 2020/0400002 A1 | 12/2020 | Magnotti, II et al. | |
| 2023/0020770 A1 | 1/2023 | Alali et al. | |
| 2023/0085175 A1 | 3/2023 | Smalls et al. | |

\* cited by examiner

DOWNHOLE APPARATUS AND SYSTEM FOR ELECTRIC-BASED FRACTURING

CROSS-REFERENCE TO RELATED APPLICATIONS

This application is a Continuation of U.S. application Ser. No. 17/376,809, filed on Jul. 15, 2021, which is incorporated herein by reference in its entirety.

GOVERNMENT LICENSE RIGHTS

This invention was made with government support under the Small Business Innovation and Research project number 1951212 awarded by the National Science Foundation. The government has certain rights in the invention.

FIELD

Disclosed embodiments are related to electric-based fracturing.

BACKGROUND

Oil and gas are expected to supply more than 50% of total energy consumed worldwide by 2040, and geothermal may meet 3-5% of global demand by 2050. Well stimulation or fracturing has become commonplace in many new well drilling and development processes. Hydraulic fracturing, the most commonly used fracturing method over the last two decades, involves injecting a mixture of water, sand, and chemicals under high pressure into a bedrock formation through the well. This process is intended to create new fractures in the formation, as well as increase the size, extent, and connectivity of existing fractures. Increasing the number, size, or connectivity of fractures may increase the flow of oil and/or gas from petroleum-bearing rock formations to a well, from which the oil and/or gas may be extracted.

SUMMARY

In some embodiments, a method of electric-based fracturing includes transmitting electricity from a surface power source along a high voltage cable to an electrode of a downhole tool within a well (wherein at least a portion of the electrode is thermally and electrically insulated from a surrounding environment of the well), transferring at least a portion of the transmitted electricity from the electrode to the surrounding environment through an exposed portion of the electrode, and heating the surrounding environment with the transferred electricity.

In some embodiments, a downhole tool for electric-based fracturing includes an outer enclosure, an insulator chamber disposed at least partially within the enclosure, and an electrode disposed at least partially within the insulator chamber. The electrode extends out from the insulator chamber and the enclosure. The electrode is configured to transfer electric energy to an exterior environment surrounding the downhole tool. The insulator chamber is configured to thermally and electrically insulate at least a portion of the electrode from the exterior environment.

In some embodiments, a system for electric-based fracturing includes a surface power source, a high voltage cable coupled to the surface power source and configured to transmit electricity from the surface power source, and a downhole tool operatively coupled to the high voltage cable. The downhole tool includes an enclosure (including a top plate, a cylindrical body, and a bottom plate), an insulator chamber disposed at least partially within the enclosure, and an electrode configured to transfer electric energy received from the high voltage cable to an exterior environment surrounding the downhole tool.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
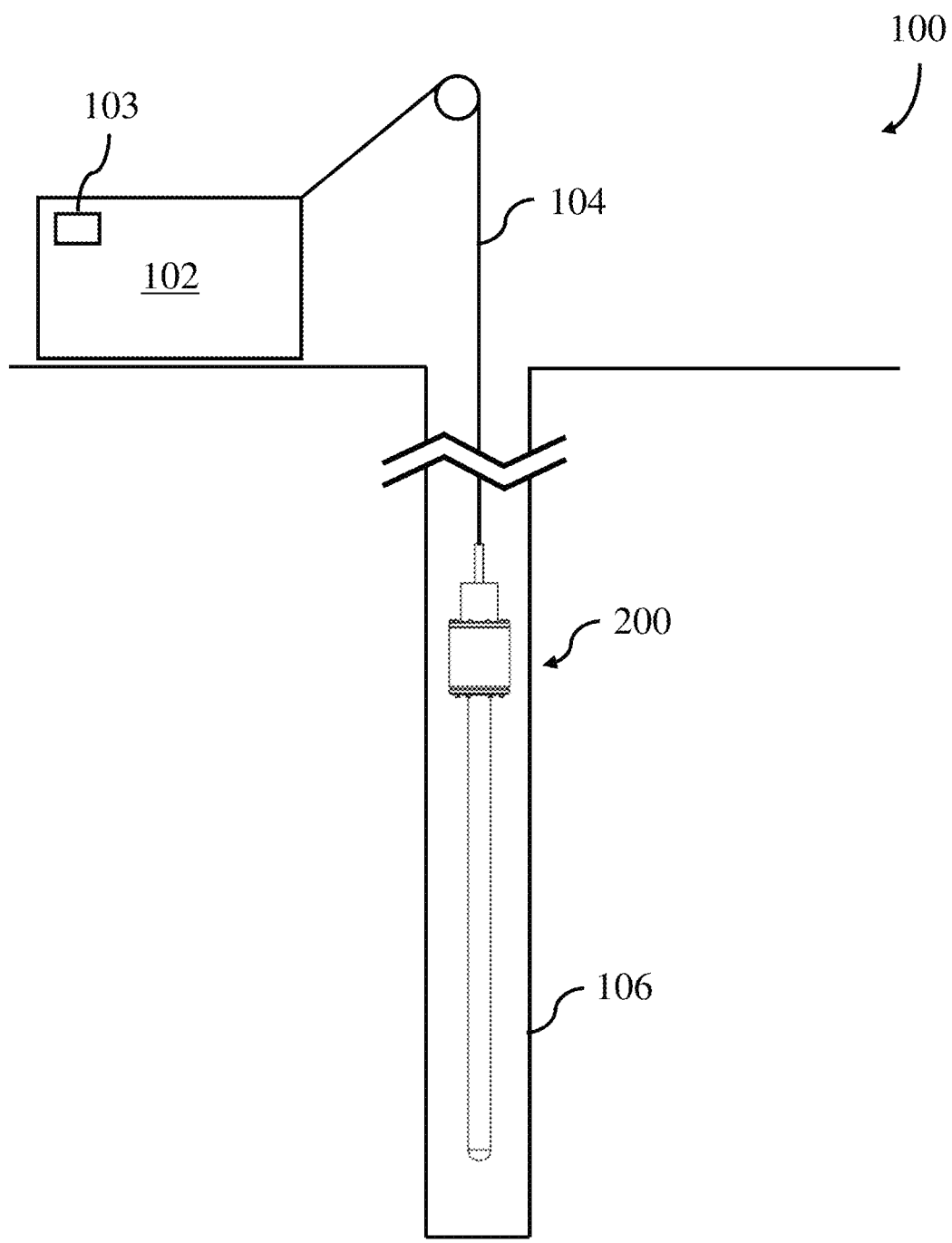
FIG. 1 depicts one embodiment of an electric-based fracturing system.

In response to the increasing concerns about environmental issues of hydraulic fracturing (e.g., large water consumption, underground water contamination, air pollution, waste production) as well as its high operational costs, electric-based fracturing methods have been developed in recent years. These methods do not rely on pumping high-pressure water and/or injecting chemicals into a well, and accordingly do not suffer the environmental consequences associated with hydraulic fracturing. Instead, electric-based fracturing methods transfer electrical energy from the surface into a well to heat the rock formation surrounding the well. The heat may induce fractures in the formation, and may induce changes in petrophysical properties of the geofluid and/or rock through a set of complex multiphysics phenomena.

Systems used to employ the above noted electric-based fracturing methods often include surface equipment (e.g., a power source), a power transmission line (e.g., a high voltage cable) that runs from the surface equipment into a well, a deployment and weight support system, and a downhole tool within the well. The downhole tool is configured to deliver energy from the surface equipment to the surrounding formation. However, downhole tools used in conventional electric-based fracturing methods are often associated with significant limitations, such as poor thermal and/or electrical insulation, or limited operating ranges. Specific examples of conventional methods and their associated limitations are described below.

One conventional electric-based fracturing method is the Pulsed Plasma Method. In this method, a high voltage plasma discharge is created between two electrodes in close vicinity within a downhole tool. The pressure wave generated from the plasma propagates into the surrounding area, fracturing the formation near the wellbore zone. However, the downhole tool and electrode in the Pulsed Plasma Method are not designed to deliver electric currents to the reservoir formation which prevents such systems from being used in fracturing methods where electrical current is applied to the formation itself.

Another conventional method used to fracture a formation is the Low-Frequency Heating Method. Although not usually used for fracturing, low-frequency heating may be used as an enhanced oil recovery method. In this method, low voltage and low power electricity is transferred to the formation by electrodes in the wells. Low power electricity is used so that the reservoir and hydrocarbons may be heated slowly over a long period of time, which may lower the viscosity of the oil within the formation, thereby enabling higher flow rates during production. Some proponents of this method have proposed using elongated steel bars as electrodes, which may be directly connected to the electrical cable extending from the surface. However, there are several limitations with an electrode of this type. For one, simple steel bars are not designed for use with high power and/or high voltage electricity, confining the applicability of the equipment to a limited range of operating conditions. Additionally, the steel bars in this method are not connected to the electric cable by any specific assembly tool that might support their weight or constrain their movement. As such, the resultingly unstable steel bars often move in the well (sometimes unpredictably), leading to damage or even mechanical failure of one or more parts of the system. Finally, there is often no enclosure that protects and/or insulates the steel bars from the surrounding downhole environment. Accordingly, a connector between the electrode and the electric cable may corrode quickly, even under relatively mild operating conditions. If the connector becomes sufficiently corroded, an electrical short to the casing, to other downhole equipment, and/or to the surface equipment may occur.

Finally, a method known as the Electrode Well Method fills fractures and/or openings that have been generated in a hydraulic fracturing operation with a conductive proppant, and then heats the proppant using a part of a well casing as a conductor. Besides suffering from poor connections between the well casing and the proppant (leading to frequent loss of electrical connection and inefficient heat transfer), this method is limited to existing wells that have already been established for hydraulic fracturing. Furthermore, because the electric current may be distributed along the entire casing rather than being concentrated in a specific operating region of interest, the generated heat may not be effectively released and/or dissipated.

In view of the above, the Inventors have recognized that conventional electric-based fracturing and reservoir stimulation methods and conventional downhole tools are inappropriate for use with high voltage and high power electric-based fracturing. The few electric-based methods that have been proposed are primarily at the concept level, and are not reliable or robust enough for deployment in the field. For example, many conventional downhole tools do not include any electrical insulation between an electrode of the downhole tool and the surrounding casing. As such, electrical shorts may occur during operations using conventional downhole tools which may result in hazardous conditions, damaged equipment, and/or adverse effects on the fracking operation (e.g., if some or all of the electric energy that was to be used for fracking is discharged in a short, the amount of energy remaining that may be delivered to the formation may be greatly reduced). Additionally, conventional downhole tools often can only accommodate low voltages and generate low heat. As such, the benefits associated with high power electric-based fracturing methods such as increased power delivery, heating, and associated fracturing of a formation are unavailable to operations that use conventional downhole tools.

In view of the above, the Inventors have recognized and appreciated the benefits associated with a downhole tool that is able to safely and reliably transfer electric energy from a high voltage cable to a formation surrounding a well, while operating in the high pressure, high temperature, and acidic environments of a well for long periods of times (e.g., multiple days or weeks). Such downhole tools may be configured to accept electric energy from a surface power source in the form of continuous DC, continuous AC, or pulsed discharges, and may be configured to accommodate high power electricity (e.g., electrical power in the range of kilowatts or megawatts). For example, in some embodiments, a downhole tool may include an electrode that is configured to apply a voltage differential to a surrounding formation relative to a corresponding electrode located in an adjacent well bore and/or on a surface of the formation. Additionally, the downhole tool may be compatible with various types of formation (e.g., sandstone, carbonate, shale), may operate in various compositions and/or concentrations of downhole brine, and may operate in petroleum, geothermal, or water wells of different types and/or sizes. That is, the surrounding environment of a downhole tool may include any of sandstone, carbonate, shale, brine, hydrocarbons, or water.

In some embodiments, a system for electric-based fracturing includes a surface power source, a high voltage cable coupled to the surface power source that is configured to transmit electricity from the surface power source, and a downhole tool operatively coupled to the high voltage cable. The downhole tool may be configured to transmit the electrical energy from the surface power source into the subsurface rock formation surrounding the well to resistively heat the formation. Heating the rock formation may induce fractures (and/or expand existing fractures), enabling the removal of oil and/or gas from the well.

As noted above, in some embodiments, a downhole tool for electric-based fracturing includes one or more electrodes configured to apply electric energy (e.g., received from a high-voltage cable coupled to a surface power source) to a formation to resistively generate heat in the formation. To facilitate such a process, in some embodiments, an electrode may be disposed at least partially within an insulator chamber, which may be configured to thermally and/or electrically insulate at least a portion of the electrode. The insulator chamber may be disposed at least partially within an outer enclosure, which may be configured to withstand the harsh environment of the well, as well as generally harsh operating conditions. The electrode may extend out from the enclosure such that at least a portion of the electrode is exposed to the surrounding environment. In some embodiments, a downhole tool for electric-based fracturing includes only a single electrode, while in other embodiments, a downhole tool includes multiple electrodes. For example, a downhole tool with multiple electrodes may include two electrodes extending out of the enclosure, each of which may be associated with different directions, angles, and/or dimensions. However, it should be appreciated that a downhole tool for electric-based fracturing may include any suitable number, arrangement, and/or orientation of electrodes, as the present disclosure is not limited in this regard.

As described above, an electrode may be configured to transmit electricity to a surrounding environment. For example, the electrode may be configured to transmit electricity to a surrounding formation, which may be subsequently heated through resistive heating (e.g., Joule heating). In some cases, the electrode may be in direct contact with brine or other geo-liquid (e.g., at the bottom of well), such that the electrode transmits electricity to the surrounding brine or other liquid, which is similarly heated through resistive heating. In these cases, the formation may be heated indirectly (e.g., the electrode heats the brine or other liquid, which subsequently heats the formation). An electrode may include electrically and/or thermally conductive materials such as platinum, copper, or a copper alloy (e.g., a cobalt copper beryllium alloy), although it should be appreciated that an electrode may include any material able to withstand the operating conditions within a well.

In some embodiments, an electrode may include a proximal portion contained within the insulator chamber and/or the enclosure of the downhole tool, and a distal portion that is exposed to the surrounding environment. The proximal portion may include a flange configured to rest on a shoulder of the insulator chamber in order to support the weight of the electrode, as explained in greater detail below in reference to FIG. 2C. The design of the electrode may include generally rounded corners and/or rounded edges, such that thermal concentrations may be avoided. For example, a distal portion of a generally cylindrical electrode may terminate in a hemispherical or otherwise rounded tip.

In some embodiments, an electrode may be shaped and/or sized based on considerations relating to compatibility with different well geometries, relative densities, heat transfer properties, and weight. In some embodiments, a cylindrical portion of an electrode may have a transverse dimension, such as a diameter, that is greater than or equal to 10 millimeters (mm), 25 mm, 50 mm, 75 mm, 100 mm, or 150 mm. In some embodiments, a cylindrical portion of an electrode may have a transverse dimension of less than or equal to 200 mm, 150 mm, 100 mm, 75 mm, 50 mm, or 25 mm. It should be appreciated that ranges of the above electrode transverse dimensions are contemplated. For example, a cylindrical portion of an electrode may have a transverse dimension of greater than or equal 25 mm and less than or equal to 75 mm. In some embodiments, an electrode may have an overall length of greater than or equal to 500 mm, 750 mm, 1000 mm, 1250 mm, 1500 mm, or 1750 mm. In some embodiments, an electrode may have an overall length of less than or equal to 2000 mm, 1750 mm, 1500 mm, 1250 mm, 1000 mm, or 750 mm. It should be appreciated that ranges of the above electrode lengths are contemplated. For example, an electrode may have a length of greater than or equal to 1000 mm and less than or equal to 1500 mm. Of course, while specific ranges of dimensions of an electrode are discussed above, other ranges both greater and less than those noted above are also contemplated.

In some embodiments, the electrode is configured to extend from the enclosure in a direction parallel to a longitudinal axis of the enclosure (e.g., the electrode may extend from the enclosure relative to a longitudinal axis of the enclosure at an angle of 0°). For example, if the downhole tool is disposed in a vertical well (i.e., in a well aligned with the direction of gravity), and the downhole tool's enclosure has a vertical longitudinal axis, the electrode may extend downwards from a bottom of the enclosure. In some embodiments, the electrode is configured to extend from the enclosure at an angle relative to a longitudinal axis of the enclosure. For example, the electrode may extend from the enclosure relative to a longitudinal axis of the enclosure at an angle of −90°, −60°, −45°, −30°, −20°, −10°, −5°−4°, −3°, −2°, −1, 1°, 2°, 3°, 4°, 5°, 10°, 20°, 30°, 45°, 60°, or 90°. It should be appreciated that an electrode may extend from an enclosure relative to a longitudinal axis of the enclosure at any suitable angle, as the present disclosure is not limited in this regard. In addition to extending at any suitable angle, an electrode may extend from any suitable portion of an enclosure. An electrode may extend from a bottom, a side, or a top of an enclosure, as the present disclosure is not limited in this regard. Furthermore, a downhole tool may include any suitable number of electrodes, as the present disclosure is not limited to downhole tools with a single electrode.

An insulator chamber of a downhole tool may be configured to provide thermal and/or electrical insulation for a portion of the high voltage cable, a portion of the electrode, and/or connections between the high voltage cable and the electrode. As the electrode transmits electrical energy into the surrounding formation, the temperature of the environment around the downhole tool increases substantially (e.g., through resistive heating of the formation). The insulator chamber may be configured to thermally isolate an interior portion of the downhole tool from the high temperature environment external to the downhole tool. Additionally, the insulator chamber may electrically isolate portions of the downhole tool. For example, the outer enclosure of the downhole tool may include components that are electrically conductive (e.g., made of high-strength metal configured to withstand the high pressures of a well environment). The insulator chamber may electrically isolate an interior portion of the downhole tool from the conductive components of the outer enclosure, thereby preventing shorts. Furthermore, by electrically insulating a proximal portion of the electrode, the insulator chamber may ensure that electrical energy is only transferred out of the exposed portion of the electrode, resulting in greater spatial control of the heat transfer process. That is, electrical energy may be transferred from the downhole tool in a repeatable and predictable manner when the insulator chamber electrically insulates a portion of the electrode.

The materials and/or geometric properties (e.g., wall thicknesses) of the insulator chamber may be selected based, at least in part, on various insulation parameters, such as an electrical breakdown voltage. For example, an insulator chamber may be designed with a breakdown voltage in excess of an operating voltage of the downhole tool. In some embodiments, at least a portion of an insulator chamber may be ceramic, such as a glass ceramic (e.g., fluorphlogopite mica in a borosilicate glass matrix such as Macor® from Corning). In some embodiments, an insulator chamber may include zirconia and/or alumina. An insulator chamber may include a substantially non-porous ceramic, which may be associated with little to no absorption of water and/or brine in the event of a leak. In some embodiments, the insulator chamber may include multiple parts to facilitate assembly and/or disassembly. For example, an insulator chamber may include a top plate, a cylindrical body, and a bottom plate configured to be assembled using non-conductive screws. Such an embodiment is elaborated on further below relative to the figures.

As explained above, an outer enclosure of a downhole tool including an electrode may be configured to withstand the harsh environment of a well. It should be appreciated that the outer enclosure may be made of any suitable material configured to withstand the temperatures and pressures of the well environment (as described below). In some embodiments, an outer enclosure may additionally be resistant to corrosion from chemicals disposed within the well. For example, the outer enclosure may be coated with a corrosion-resistant coating, or the outer enclosure may be made from a corrosion-resistant material. In some embodiments, the outer enclosure is made of, or is coated with, stainless steel, although other materials including, but not limited to, steel, iron, aluminum, titanium, nickel, copper, chromium, carbon, alloys thereof, and/or any other appropriate material as the present disclosure is not limited in this regard. Austenitic stainless steels cold worked 3% Mo high-nickel alloy steels, and/or precipitation-hardening nickel-based alloys may also be suitable for some environments containing high levels of $H_2S$, $CO_2$, and chlorides at moderately high temperatures. In some embodiments, a thermal coefficient of the outer enclosure and a thermal coefficient of the insulator chamber may be jointly selected in order to minimize and/or eliminate stresses at the interface of the outer enclosure and the insulator chamber.

In some embodiments, a downhole tool may be modular. For example, various components of the downhole tool (e.g., an enclosure, an insulator chamber) may include multiple parts that are removably coupled such that the downhole tool may be easily assembled and/or disassembled. A modular downhole tool may be able to be transported to an operation site in multiple pieces, which may be logistically simpler than transporting a single, large downhole tool. Additionally, a modular downhole tool may facilitate cleaning, repair, or replacement of the various components of the downhole tool.

It should be appreciated that a power source may be configured to generate (and a high voltage cable may be configured to accommodate) electricity of any suitable voltage that is to be transmitted to an electrically coupled downhole tool, as the disclosure is not limited in this regard. In some embodiments, the power source may be configured to generate a peak voltage of greater than or equal to 5 kilovolts (kV), 10 kV, 25 kV, 50 kV, or 100 kV. In some embodiments, the power source may be configured to generate a peak voltage of less than or equal to 200 kV, 100 kV, 50 kV, 25 kV, or 10 kV. Typical operating ranges may include voltages in the range of 12-30 kV. However, other combinations of the forgoing as well as voltage ranges both greater and less than those noted above are also contemplated.

It should be appreciated that a power source may be configured to generate (and a high voltage cable may be configured to accommodate) electricity of any suitable current, as the disclosure is not limited in this regard. In some embodiments, the power source may be configured to generate a peak current of greater than or equal to 10 amperes (A), 20 A, 50 A, 100 A, 250 A, or 500 A. In some embodiments, the power source may be configured to generate a peak current of less than or equal to 1000 A, 500 A, 250 A, 100 A, 50 A, or 20 A. Typical operating ranges may include currents in the range of 30-45 A. However, current ranges both greater than and less than those noted above are also contemplated.

It should be appreciated that while some energy may be lost during transmission, a majority of the energy transmitted from the power source may be transferred from the electrode to the surrounding environment through an exposed portion of the electrode. As used herein, the term "input energy" may refer to the energy supplied by the power source, and the term "output energy" may refer to the energy emitted by the electrode. In some embodiments, the system efficiency (e.g., the output energy divided by the input energy) may be greater than or equal to 25%, 50%, 70%, 80%, 85%, 90%, or 95%. In some embodiments, the system efficiency may be less than or equal to 99%, 95%, 90%, 85%, 80%, 70%, or 50%. Typical system efficiencies may include efficiencies in the range of 80-99%, or 90-95%. However, system efficiency ranges both greater than and less than those noted above are also contemplated.

The high voltage cable may be any suitable cable configured to withstand both the operational ranges of the power source described above, as well as the temperature and pressure of the well environment during a fracturing operation. In some cases, a well environment during a fracturing operation may be associated with a temperature greater than or equal to 100° C., 200° C., 300° C., 400° C., or 500° C. In some cases, a well environment may be associated with a temperature less than or equal to 600° C., 500° C., 400° C., 300° C., or 200° C. In some cases, a well environment may be associated with a pressure of greater than or equal to 1,000 pounds per square inch (psi), 2,000 psi, 3,000 psi, 5,000 psi, 10,000 psi, or 15,000 psi. In some cases, a well environment may be associated with a pressure of less than or equal to 20,000 psi, 15,000 psi, 10,000 psi, 5,000 psi, 3,000 psi, or 2,000 psi. However, pressure ranges both greater than and less than those noted above are also contemplated.

In some embodiments, an outer enclosure of a downhole tool may be configured to withstand a temperature of greater than or equal to 100° C., 200° C., 300° C., 400° C., or 500° C. In some embodiments, an outer enclosure of a downhole tool may be configured to withstand a temperature of less than or equal to 600° C., 500° C., 400° C., 300° C., or 200° C. In some embodiments, an outer enclosure of a downhole tool may be configured to withstand a pressure of greater than or equal to 1,000 pounds per square inch (psi), 2,000 psi, 3,000 psi, 5,000 psi, 10,000 psi, or 15,000 psi. In some embodiments, an outer enclosure of a downhole tool may be configured to withstand a pressure of less than or equal to 20,000 psi, 15,000 psi, 10,000 psi, 5,000 psi, 3,000 psi, or 2,000 psi. It should be appreciated that an outer enclosure of a downhole tool may be configured to withstand ranges and/or combinations of temperatures and pressures. For example, the outer enclosure of a downhole tool may be configured to withstand a temperature of greater than or equal to 100° C. and less than or equal to 400° C., and a pressure of greater than or equal to 2000 psi and less than or equal to 3000 psi. Of course, an outer enclosure of a downhole tool may be configured to withstand other combinations of temperature and pressure, and it should be appreciated that the present disclosure is not limited in this regard.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts one embodiment of an electric-based fracturing system 100. The system 100 includes a surface power source 102 coupled to a downhole tool 200 disposed within a well 106. The power source 102 is connected to the downhole tool 200 by a high voltage cable 104 that is configured to transmit power from the power source to the downhole tool. As described above, the well environment may include any of sandstone, carbonate, shale, brine, petroleum, water, or other formation compositions such as $H_2S$ or $CO_2$. Again, as noted above, an electric-based fracturing operation may occur at well temperatures in excess of 350° C. and/or at well pressures in excess of 2500 psi. The downhole tool 200 is described in greater detail below in reference to FIGS. 2A-2C. In some embodiments, an electric-based fracturing system includes at least one processor and associated controller or memory, such as the processor 103 of the system 100 of FIG. 1. The processor may be configured to perform any of the methods described herein and/or any other suitable methods. For example, the processor 103 may be configured to control the power transmitted to the downhole tool 200.

Figure 2A:
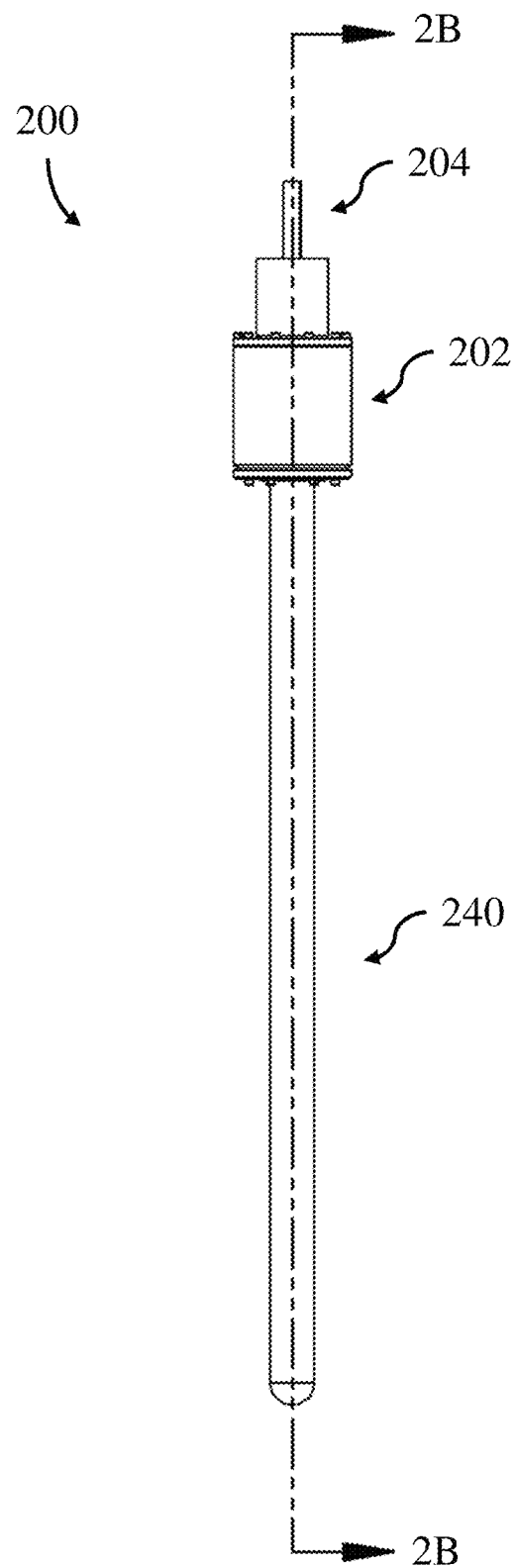
FIG. 2A is a front view of one embodiment of a downhole tool of an electric-based fracturing system.
Figure 2B:
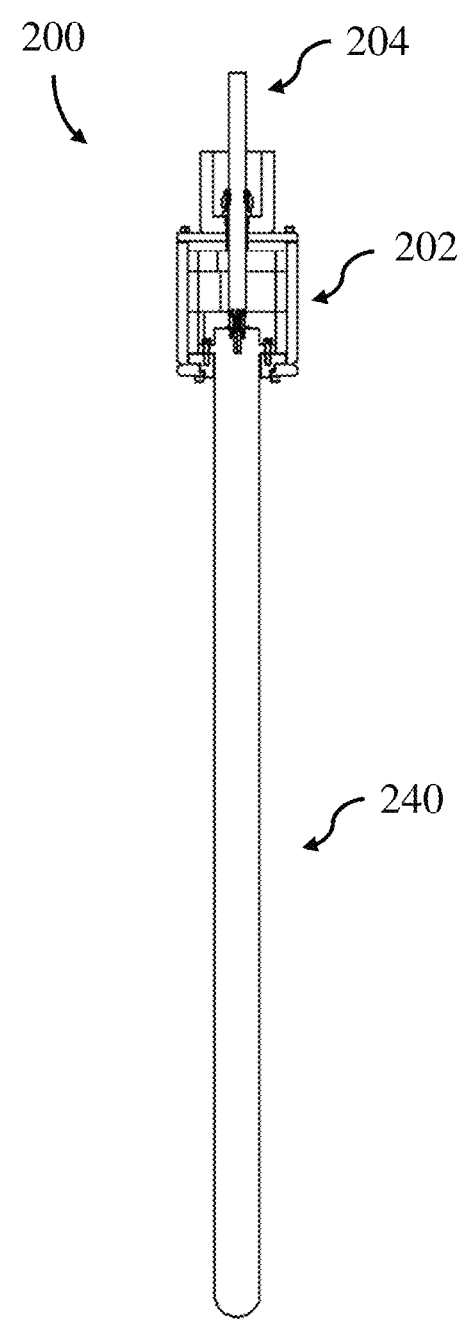
FIG. 2B is a cross-sectional view of the downhole tool of FIG. 2A.
Figure 2C:
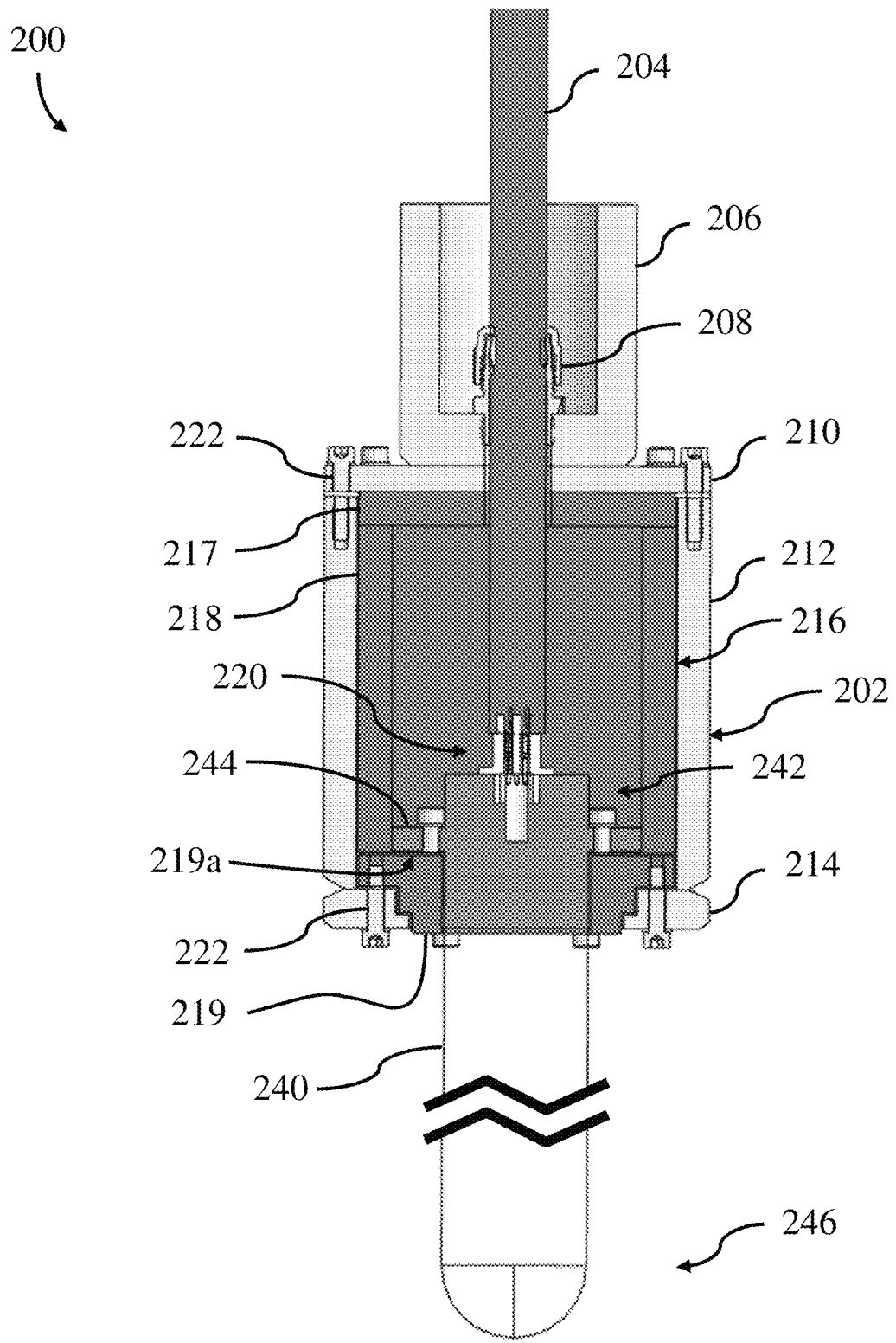
FIG. 2C is an enlarged cross-sectional view of a portion of the downhole tool of FIG. 2A.

FIGS. 2A-2C depict one embodiment of a downhole tool 200 of an electric-based fracturing system. FIG. 2A is a front view of the downhole tool 200, FIG. 2B is a cross-sectional view of the downhole tool 200, and FIG. 2C is an enlarged cross-sectional view of a portion of the downhole tool 200. Referring initially to FIGS. 2A and 2B, the downhole tool 200 includes an enclosure 202 and an electrode 240 extending out from the enclosure. The enclosure 202 is configured to enclose a portion of the electrode 240, and is configured to receive a distal portion of a high voltage cable 204 that is electrically connected to the electrode.

FIG. 2C shows additional details of the downhole tool 200. As described above in relation to FIGS. 2A and 2B, the downhole tool 200 generally includes an electrode 240 and an enclosure 202. The enclosure 202 includes a top plate 210, a body 212, and a bottom plate 214. The top plate 210 includes a pass through for the high voltage cable 204, and couples to the high voltage cable 204 through a coupling 206 (described in greater detail below). The bottom plate 214 includes a pass through for the electrode 240. The two plates and the body may be made of any suitable material configured to withstand the temperature, pressure, and chemical environment of the well. In some embodiments, the enclosure is made of stainless steel.

Figure 3:
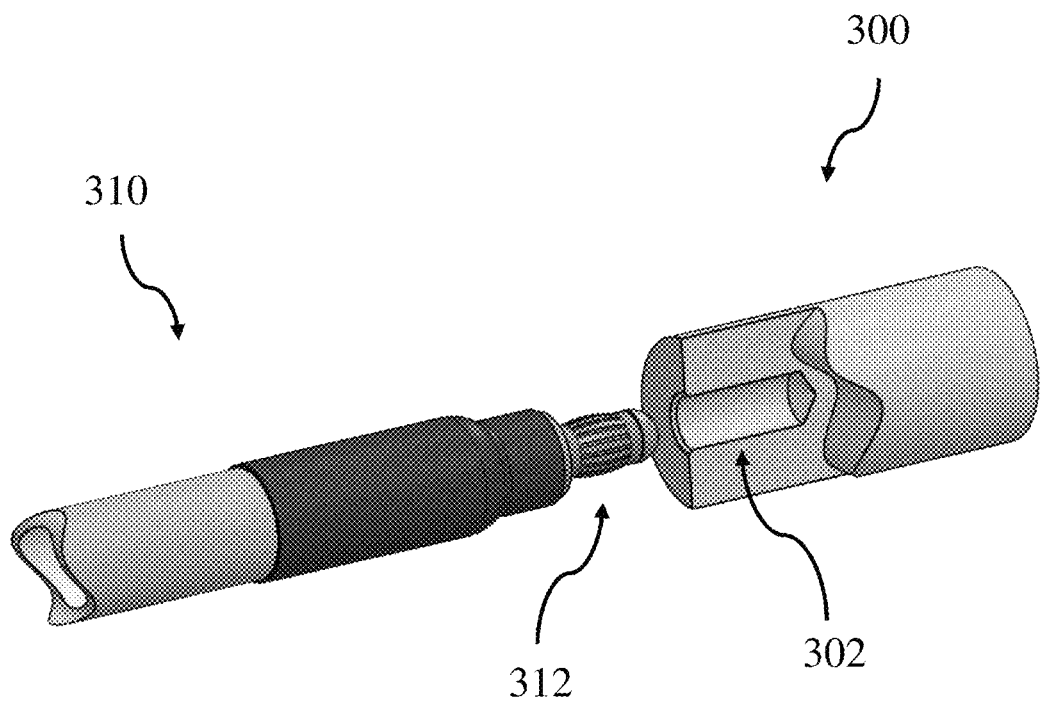
FIG. 3 depicts one embodiment of an interface between a high voltage cable and an electrode.

In some embodiments, the top and bottom plates 210 and 214 are removably coupled to the body 212. For example, non-conductive screws 222 may extend through throughholes in the top and bottom plates 210 and 214 and engage threads in the body 212. While screws are shown in the embodiment of FIG. 3, it should be appreciated that a plate and a body of an enclosure may be removable coupled using any suitable removable coupling, including but not limited to screw, bolts, other fasteners, latches, clamps, tapered fittings, lock and key interfaces, or any other appropriate coupling. In some embodiments, one plate may be fixedly coupled to the body, and the other plate may be removably coupled to the body.

In some embodiments, the body 212 is a hollow cylindrical body, and the top and bottom plates 210 and 214 are circular plates. While there may be benefits associated with a radially symmetric enclosure, it should be appreciated that an enclosure may have any suitable shape, as the present disclosure in not limited in this regard.

In some embodiments, a joint sealer may additionally be used between the different parts of the enclosure, and may be configured to seal the joints of the enclosure from the environment of the well. For example, joint sealer may be applied at the interface between the top plate 210 and the body 212. The joint sealer may be applied as a liquid and solidified in a curing process (e.g., the joint sealer may be solidified using heat). The joint sealer may be designed to withstand the temperatures and pressures of the well during a fracturing operation.

An insulator chamber 216 may be disposed at least partially within the enclosure 202, and may be configured to thermally and/or electrically insulate at least a portion of the electrode 240 relative to an external environment surrounding the insulator chamber and associated enclosure. The insulator chamber 216 includes a top plate 217, a body 218, and a bottom plate 219. The parts of the insulator chamber 216 (e.g., the top plate 217, the body 218, and the bottom plate 219) may be shaped and/or sized to fit within the enclosure 202. For example, the insulator chamber 216 and the enclosure 202 may both be cylindrical, and an outer diameter of the insulator chamber 216 may be selected based, at least in part, on an inner diameter of the enclosure 202. Accordingly, the insulator chamber 216 may form a conformal fit with the enclosure 202. As described above, a downhole tool with an enclosure and/or an insulator chamber that include multiple parts may facilitate assembly and/or disassembly, such as during cleaning or repair. As with the enclosure, non-conductive screws may removably couple the plates 217 and 219 to the body 218 of the insulator chamber 216. As with the enclosure, a joint sealer may be used at interfaces of an insulator chamber.

As described above, the materials and/or geometric properties (e.g., wall thicknesses) of the insulator chamber may be selected based, at least in part, on various insulation parameters, such as an electrical breakdown voltage. For example, an insulator chamber may be designed with a breakdown voltage in excess of an operating voltage of the downhole tool. In some embodiments, an electrical breakdown voltage of the insulator chamber may be greater than or equal to 5 kV, 10 kV, 25 kV, 50 kV, or 100 kV. In some embodiments, an electrical breakdown voltage of the insulator chamber may be less than or equal to 200 kV, 100 kV, 50 kV, 25 kV, or 10 kV. However, breakdown voltages both greater than and less than those noted above are also contemplated.

As noted above, the downhole tool 200 may be connected to and supported by a high voltage cable 204, though instances in which a downhole tool is physically supported using a different structure such as a separate cable, a drill string, or other supporting structure are also contemplated. In either case, in some embodiments, a downhole tool may be physically connected to the high voltage cable through a coupling 206 or other appropriate connection. The coupling 206 may be configured to connect the enclosure 202 of the downhole tool 200 to a drill pipe (or other supporting tool). In some embodiments, a coupling may be directly attached to a bottom of a drill pipe. A coupling may be made of stainless steel, or any other appropriate material configured to withstand the well environment. In the embodiment of the figure, the coupling 206 includes a cable gland 208 configured to operatively couple the downhole tool 200 to the high voltage cable 204. The cable gland 208 may be configured to form a seal around the high voltage cable 204 that passes from the exterior of the enclosure 202 to an interior of the enclosure, which may isolate the interior of the downhole tool 200 from the external well environment. For example, the cable gland 208 may include an inner portion with proximal threads and distal threads. The proximal threads may be configured to engage with threads of an outer portion of the cable gland, such that rotating the outer portion of the cable gland relative to the inner portion tightens the inner portion around the high voltage cable 204, thereby forming a seal (e.g., a waterproof seal configured to withstand the temperatures and pressures of the downhole environment). In some embodiments, the inner portion of the cable gland may be permanently deformed when the outer portion is tightened. The distal threads of the inner portion of the cable gland may be configured to engage with threads on the coupling 206. As with other components of a downhole tool, a cable gland may be rated for the temperatures and pressures of the well environment experienced during a fracturing operation.

As also noted above, a high voltage cable may be electrically connected to an electrode of a downhole tool. A distal portion of the high voltage cable 204 may pass through the cable gland 208 of the coupling 206, through the top plate 210 of the enclosure 202, and through the top plate 217 of the insulator chamber 216. Accordingly, the high voltage cable 204 may extend into and terminate within an interior of the insulator chamber 216. The high voltage cable 204 couples to the electrode 240 within an interior of the insulator chamber 216 through an electrode-cable connector 220. One embodiment of an electrode-cable connector is detailed below relative to FIG. 3. However, it should be appreciated that any suitable connector configured to couple a cable and an electrode and configured to withstand the operating voltages and currents described herein may be used, as the present disclosure is not limited in this regard. When electrically coupled to the electrode, the high voltage cable 204 may deliver electricity to the electrode 240, which may subsequently transmit the electricity to a surrounding formation as part of a fracturing operation.

In order to expose the electrode of a downhole tool to a desired environment for delivering the noted voltages to a formation, an electrode 240 as shown in the figures may extend out from the enclosure 202 such that a portion of the electrode is contained within the enclosure 202 and a portion is external to the enclosure 202. For example, a proximal portion 242 of the electrode 240 may be contained within the enclosure 202, while a distal portion 246 of the electrode 240 may be external to the enclosure 202. The electrode 240 may pass through aligned openings formed in the bottom plate 219 of the insulator chamber 216 and through the bottom plate 214 of the enclosure 202. In some embodiments, a seal may be formed between one or more of the electrode and the opening formed in the bottom plate of the enclosure and/or the insulator chamber which may help to maintain both a physical and electrical isolation of the components within the enclosure relative to the surrounding exterior environment. As described above, the electrode may project from the enclosure at any suitable angle relative to the enclosure, as the present disclosure is not limited in this regard. In the embodiment of FIG. 2C, the electrode 240 is an elongate cylindrical electrode. The electrode 240 terminates at a distal end in a hemispherical tip, although it should be appreciated that other tapered geometries may be appropriate. As will be described in greater detail below, a proximal portion of the electrode 240 may include a flange 244. Additionally, while there may be benefits associated with a radially symmetric electrode, it should be appreciated that an electrode may have any suitable shape, as the present disclosure in not limited in this regard.

In some applications it may be desirable to electrically isolate an electrode from an exterior enclosure of a downhole tool while also maintaining a position and orientation of the electrode within the overall tool. Accordingly, in some embodiments, a proximal portion of an electrode may include a flange configured to support the weight of the electrode. For example, in FIG. 2C the proximal portion 242 of the electrode 240 includes a flange 244. The flange 244 may be a portion of the electrode 240 that has a larger transverse dimension (e.g., a diameter) than the transverse dimension of the surrounding portion of the electrode, such that the flange 244 extends radially outward relative to the surrounding electrode. The flange 244 is configured to be received by a shoulder 219a of the bottom plate 219 of the insulator chamber 216. The shoulder 219a may be a portion of the bottom plate 219 that includes a flat face (e.g., a top face of the bottom plate 219a) and a perpendicular through-hole (e.g., a hole through which the main body of the electrode 240 extends). The shoulder 219a may be sized and/or shaped based, at least in part, on the dimensions and/or geometry of the flange 244. When the shoulder 219a receives the flange 244, the weight of the electrode 240 may be supported by the flange 244 resting on the shoulder 219a.

FIG. 3 depicts one embodiment of an interface between a high voltage cable 310 and an electrode 300. In the embodiment of FIG. 3, the high voltage cable 310 is configured to couple to the electrode 300 through a press fit interface. Specifically, a pin 312 at a terminal end of the high voltage cable is sized and shaped to be press fit into a receiving slot 302 formed in a proximal portion of the electrode 300, or a structure electrically coupled to the electrode 300. As would be appreciated by one of skill in the art, a press fit (also called an interference fit) may refer to a coupling in which a protruding structure is slightly oversized relative to a receiving structure. In the embodiment of FIG. 3, a diameter of the pin 312 is slightly larger than a diameter of the receiving slot 302, such that the pin and/or the slot are at least partially deformed when the pin is inserted into the slot. As described above in relation to FIG. 2C, a high voltage cable may be configured to couple to an electrode within an insulator chamber (and/or within an enclosure) of a downhole tool. The high voltage cable may couple to the electrode within an insulator chamber of a downhole tool in order to thermally and/or electrically insulate the coupling point, and/or to protect the coupling point from the harsh well environment exterior to the downhole tool.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

What is claimed is:

1. A downhole tool for electric-based fracturing, the downhole tool comprising:
   an outer enclosure;
   an insulator chamber disposed at least partially within the enclosure and comprising a top plate, a cylindrical body, and a bottom plate; and
   an electrode disposed at least partially within the insulator chamber, the electrode extending out from the insulator chamber and the enclosure, wherein the electrode is configured to transfer electric energy to an exterior environment surrounding the downhole tool,
   wherein the top plate, the cylindrical body, and/or the bottom plate are configured to be assembled and disassembled, and wherein the outer enclosure is configured to withstand a temperature of at least 300° C. and a pressure of at least 2000 psi.

2. The downhole tool of claim 1, wherein the top plate, the cylindrical body, and/or the bottom plate are configured to be assembled and/or disassembled with non-conductive screws.

3. The downhole tool of claim 1, wherein the outer enclosure is formed from a corrosion resistant material.

4. The downhole tool of claim 1, wherein the electrode extends out from the enclosure in a direction parallel to a longitudinal axis of the enclosure.

5. The downhole tool of claim 1, wherein the electrode extends out from the enclosure at an angle relative to a longitudinal axis of the enclosure.

6. The downhole tool of claim 1, wherein the electrode includes a proximal portion and a distal portion, wherein the proximal portion of the electrode includes a flange.

7. The downhole tool of claim 6, wherein the flange is configured to support a weight of the electrode.

8. The downhole tool of claim 6, wherein the flange is received by a shoulder of the insulator chamber.

9. A method of electric-based fracturing, the method comprising:
transmitting electricity from a surface power source along a high voltage cable to an electrode of a downhole tool within a well, wherein at least a portion of the electrode is thermally and electrically insulated from a surrounding environment of the well, wherein the electrode is at least partially within an insulator chamber comprising a top plate, a cylindrical body, and a bottom plate;
transferring at least a portion of the transmitted electricity from the electrode to the surrounding environment through an exposed portion of the electrode; and
heating the surrounding environment with the transferred electricity,
wherein the top plate, the cylindrical body, and/or the bottom plate are configured to be assembled and disassembled, and wherein transmitting electricity includes transmitting electricity with a voltage of at least 30 kilovolts (kV) and/or a current of at least 40 amperes (A).

10. The method of claim 9, wherein the top plate, the cylindrical body, and/or the bottom plate are configured to be assembled with non-conductive screws.

11. The method of claim 9, wherein transmitting electricity includes transmitting one or more selected from a group of continuous DC, continuous AC, and pulsed electric discharges.

12. The method of claim 9, further comprising:
removing the downhole tool from the well;
disassembling the downhole tool; and
reassembling the downhole tool.

13. The method of claim 12, wherein disassembling the downhole tool comprises removing non-conductive screws from the top plate, the cylindrical body, and/or the bottom plate of insulator chamber.

14. The method of claim 12, wherein reassembling the downhole tool comprises combining the top plate, the cylindrical body, and/or the bottom plate of the insulator chamber with non-conductive screws.

15. The method of claim 9, wherein the surrounding environment includes one or more selected from a group comprising sandstone, carbonate, shale, brine, petroleum, $H_2S$, $CO_2$, and water.

16. The method of claim 9, wherein transferring the transmitted electricity from the electrode to the surrounding environment comprises transferring a majority of the transmitted electricity from the electrode to the surrounding environment.

17. A downhole tool for electric-based fracturing, the downhole tool comprising:
an outer enclosure;
an insulator chamber disposed at least partially within the enclosure and comprising a top plate, a cylindrical body, and a bottom plate; and
an electrode disposed at least partially within the insulator chamber, the electrode extending out from the insulator chamber and the enclosure, wherein the electrode is configured to transfer electric energy to an exterior environment surrounding the downhole tool,
wherein the top plate, the cylindrical body, and/or the bottom plate are configured to be assembled and disassembled, and wherein at least a portion of the insulator chamber is a substantially non-porous ceramic.

18. The downhole tool of claim 17, wherein the top plate, the cylindrical body, and/or the bottom plate are configured to be assembled and/or disassembled with non-conductive screws.

19. The downhole tool of claim 17, wherein the outer enclosure is formed from a corrosion resistant material.

20. The downhole tool of claim 17, wherein the electrode extends out from the enclosure in a direction parallel to a longitudinal axis of the enclosure.

21. The downhole tool of claim 17, wherein the electrode extends out from the enclosure at an angle relative to a longitudinal axis of the enclosure.

22. The downhole tool of claim 17, wherein the electrode includes a proximal portion and a distal portion, wherein the proximal portion of the electrode includes a flange.

23. The downhole tool of claim 22, wherein the flange is configured to support a weight of the electrode.

24. The downhole tool of claim 22, wherein the flange is received by a shoulder of the insulator chamber.

* * * * *